(12) United States Patent
Ritter

(10) Patent No.: US 7,157,892 B1
(45) Date of Patent: Jan. 2, 2007

(54) ROBUST RAMP CONTROLLED ENABLE FOR VOLTAGE REGULATOR

(75) Inventor: David Wayne Ritter, San Jose, CA (US)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 11/288,882

(22) Filed: Nov. 28, 2005

(51) Int. Cl.
*G05F 1/56* (2006.01)
*G05F 1/618* (2006.01)

(52) U.S. Cl. ............... 323/284; 323/288; 323/901
(58) Field of Classification Search ........... 323/282, 323/284, 901, 906, 288; 363/49
See application file for complete search history.

(56) References Cited

U.S. PATENT DOCUMENTS

| | | | |
|---|---|---|---|
| 5,521,809 A | * | 5/1996 | Ashley et al. ............ 363/71 |
| 6,100,677 A | * | 8/2000 | Farrenkopf ............... 323/285 |
| 6,278,624 B1 | * | 8/2001 | Nelson .................... 363/65 |
| 6,430,070 B1 | * | 8/2002 | Shi et al. ................. 363/97 |
| 6,906,499 B1 | * | 6/2005 | Hussein et al. .......... 323/222 |

* cited by examiner

*Primary Examiner*—Bao Q. Vu
(74) *Attorney, Agent, or Firm*—Bever, Hoffman & Harms, LLP; Patrick T. Bever

(57) ABSTRACT

A voltage regulator including a bandgap control circuit that maintains the regulator's bandgap voltage at a predetermined voltage level after an externally generated enable signal is de-asserted until the regulated output voltage has dropped below a predetermined low reference voltage. The bandgap control circuit includes a latch that is set by the enable control signal to generate a bandgap control signal, which is used to activate a bandgap reference generator that generates the bandgap voltage. The latch is reset to de-assert the bandgap control signal by a logic gate and a low output voltage detector. The detector generates a low output voltage detection signal when the regulated output voltage falls below a low reference voltage. The logic gate generates a rising edge signal that resets the latch only when the enable signal is de-asserted and the detector generates the detection signal, thereby preventing unintended shutdown of the bandgap reference generator.

11 Claims, 3 Drawing Sheets

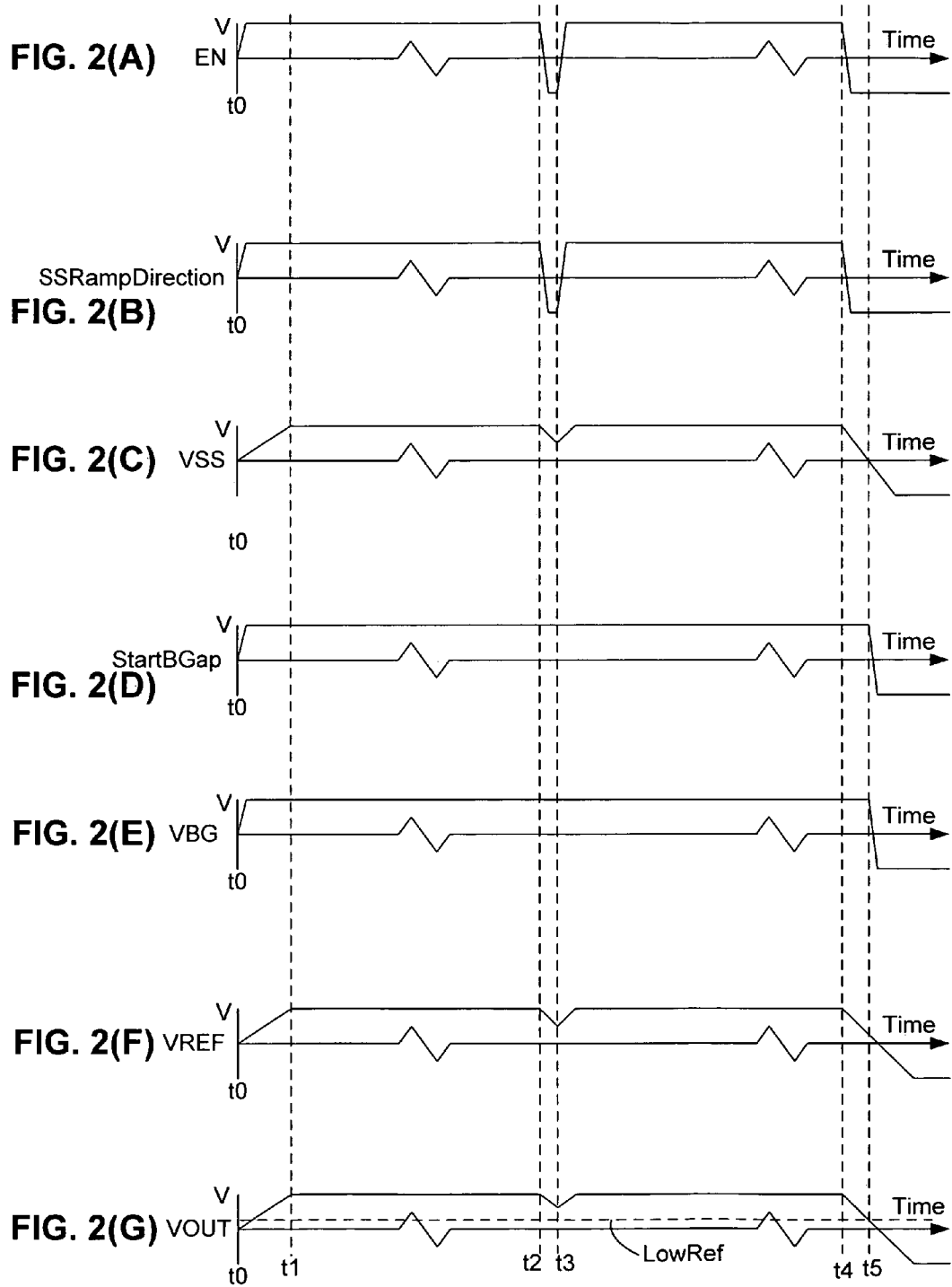

ROBUST RAMP CONTROLLED ENABLE FOR VOLTAGE REGULATOR

FIELD OF THE INVENTION

This invention relates to voltage regulators and, more particularly, to voltage regulators providing soft-start and soft-stop functions at startup and shutdown, respectively.

BACKGROUND OF THE INVENTION

Voltage regulators are well known in the art. These devices attempt to provide a stable, nearly constant (regulated) supply voltage to a load. Further, these devices attempt to maintain the supply voltage at the nearly constant value regardless of the current demands of the load. In one practical application, voltage regulators are utilized in complex electronic systems to convert an unregulated supply voltage (e.g., from a battery) into a regulated supply voltage of a predetermined value that is supplied to one or more discrete components of the complex electronic systems.

Complex electronic systems incorporating components such as microprocessors, field programmable gate arrays (FPGAs), and digital application specific integrated circuits (ASICs) often require voltage regulators that can perform ramp control functions of their regulated output voltages at startup and shutdown. Such complex systems typically "ramp up" their internal system power at startup in response to the assertion of an externally supplied enable control signal (i.e., a control signal passed to the system from an external source through a device pin), and "ramp down" their internal system voltages at shutdown (i.e., when the enable control signal is de-asserted).

This invention relates to voltage regulators for complex electronic systems that provide "ramped up" (often referred to as "soft-start") startup voltages and "ramped down" (often referred to as "soft-stop") shutdown voltages. The soft-start and soft-stop functions control system components at startup and shutdown such that supply voltages rises at a known controlled rate at startup, stop reliably at the programmed operating voltage without overshoot, and then decrease at a controlled rate at shutdown. The soft-start function is particularly used to control inrush currents in capacitors, minimize load surges in battery sources, or to moderate the effect of voltage spikes. The soft-start function typically utilizes a user-supplied external capacitor that is mounted to a dedicated external pin of the voltage regulator. A small current applied to this soft-start capacitor during the startup process causes the charge stored in the capacitor to gradually increase, and this gradually increasing charge is utilized to produce the ramped voltage signal. During soft-stop operations, the current applied to the soft-start capacitor is reversed, and the voltage ramps down as the soft start capacitor discharges.

It is often desirable that devices of a complex system have delayed response to the de-assertion of the enable control signal, allowing time for "ramp down" of power, or simply a grace period of good power after the enable control signal is de-asserted. To accomplish this, some conventional voltage regulators may use 'derivative enable' wherein the leading edge of enable is used to signify 'turn on', and the trailing edge to signify 'turn off'. This approach is subject to multiple failure modes due to transient conditions at the load or at VIN. Such transients may cause a shut down of the basic bandgap biasing, leaving the device 'dead in the water' due to a short transient phenomenon. This effectively amplifies a short-term transient into a system wide failure.

What is needed is a method and structure for controlling the operation of a voltage regulator that both provides soft-start/soft-stop functionality and resists shut down of the basic bandgap biasing in response to a short transient event, thereby preventing undesirable system wide failures due to such short transient events.

SUMMARY OF THE INVENTION

The present invention is directed to a voltage regulator including a bandgap control circuit that maintains the regulator's bandgap voltage at its predetermined voltage level when the enable control signal is de-asserted until the regulated output voltage has dropped below a predetermined low reference voltage, thereby facilitating controlled and reliable shutdown of the voltage regulator when enable control signal is in fact de-asserted, and preventing undesirable bandgap shutdown due to a short transient event.

Similar to conventional voltage regulators, the voltage regulator of the present invention utilizes a bandgap reference generator, a soft-start/soft-stop circuit, a reference voltage comparator, an output circuit, a timing circuit, and a power good comparator. The bandgap reference generator generates a predetermined bandgap voltage in response to the bandgap control signal asserted by the bandgap control circuit. The soft-start/soft-stop control circuit generating a gradually increasing "soft-start" ramped voltage/signal during a startup period, and a gradually decreasing "soft-stop" ramped voltage during a shutdown period. The reference voltage comparator receives the bandgap voltage and the ramped (soft-start/soft-stop) signal, and generates a reference signal that is equal to the ramped voltage while the ramped voltage is lower than the bandgap voltage, and is equal to the bandgap voltage when the bandgap voltage is lower than the ramped voltage. The output circuit includes an error amplifier and output driver circuit that generate the regulated output voltage in response to the reference signal and a feedback signal. The power good comparator compares the feedback signal and the reference signal, and de-asserts an output voltage monitor signal whenever the regulated output voltage is out of regulation by more than a predetermined amount (e.g., 10%). The timing control circuit receives the enable control signal and the output voltage monitor signal, and transmits a power-on-reset (POR) control signal to a POR pin only when both the enable control signal is asserted and the output voltage monitor signal indicates that the output voltage is in regulation.

According to an embodiment of the present invention, the bandgap control circuit includes a latch, a logic gate, and a detector. The latch includes a set terminal that is connected to receive the externally supplied enable control signal, and a reset terminal connected to an output terminal of the logic gate. The latch operates to generate the bandgap control signal at its output terminal when the enable control signal is asserted, and maintains the bandgap control signal in an asserted state until the logic gate transmits a rising edge signal to the latch's reset terminal. The detector compares the regulated output voltage with a predetermined low reference voltage, and generates a low output voltage detection signal when the regulated output voltage falls below the low reference voltage. The logic gate has a first input terminal coupled to receive the enable control signal, and a second input terminal coupled to the output terminal of the detector. The logic gate is configured to generate a high output signal only when the enable control signal is de-asserted and the detector generates the low output voltage detection signal. Thus, the latch is reset and the bandgap control signal is de-asserted only when both the enable control signal is de-asserted and the regulated output voltage has dropped below the predetermined low reference voltage signal.

At system startup, the asserted enable control signal is transmitted to the soft-start circuit and the bandgap control circuit. In the bandgap control circuit, the latch is set in response to the rising edge of the asserted enable control signal, thereby transmitting the bandgap control signal to the bandgap reference generator, which causes the bandgap reference generator to begin generating the bandgap voltage. The bandgap voltage is applied to one terminal of the reference voltage ("MIN AMP") comparator, and is also utilized by other components of the voltage regulator. The soft-start circuit is also activated by the asserted enable control signal, which generates the gradually increasing soft-start signal that is applied to the other terminal of the reference voltage comparator. While the soft-start signal is less than the bandgap voltage, the reference voltage comparator passes the soft-start signal to the output circuit, causing the output circuit to ramp the regulated output voltage at a controlled rate. When the soft-start signal becomes greater than the bandgap voltage, the reference voltage comparator passes the bandgap voltage to the output circuit, which fixes the regulated output voltage at the predetermined target voltage level. During subsequent "normal" operation, the regulated output voltage is maintained at the predetermined target voltage level by the bandgap voltage.

In accordance with an aspect of the invention, the voltage regulator prevents undesirable bandgap shutdowns that can occur in the event of a short transient event during normal operation using conventional techniques. The short transient event is typically characterized by a brief drop in the enable control signal (i.e., a falling edge followed by a restoring rising edge), or a brief drop in the regulated output voltage below the low reference voltage due, for example, to loading conditions. In accordance with the present invention, the brief enable control signal de-assertion causes the soft-start/soft-stop circuit to briefly initiate soft-stop operation (i.e., the soft-start/soft-stop signal begins to gradually decrease). However, the latch of the bandgap control circuit continues to assert the bandgap control signal because the regulated output voltage remains high at the beginning of the short transient event (i.e., the high regulated output voltage causes the detector to transmit a high detection signal to the logic gate, which in turn maintains a low signal on the reset terminal of the latch). Moreover, by setting the low reference voltage at a suitable low voltage level (e.g., in the range of 100 to 200 mV), in most cases the brief enable control signal de-assertion caused by the short transient event would not be long enough to allow the regulated output voltage to drop below the low reference voltage, thereby preventing reset of the latch, and maintaining the bandgap voltage at its steady state. At the end of the short transient event (i.e., when the enable control signal is re-asserted), the soft-start/soft-stop signal again increases to its maximum value, thereby reestablishing the regulated output voltage at the predetermined target voltage level set by the bandgap voltage. Similarly, when the regulated output voltage briefly drops below the low reference voltage, the high enable control signal prevents reset of the latch, thus maintaining the bandgap voltage at its steady state and allowing the regulated output voltage to recover to its predetermined target voltage level. Accordingly, the voltage regulator exhibits robustness due to its ability to avoid unintended system wide shutdown or failure due to a short transient event.

When the system is subsequently shutdown, the enable control signal remains de-asserted for a longer period than during the short transient event, allowing the soft-start/soft-stop circuit enough time to pull the regulated output voltage below the low reference voltage. In turn, the bandgap voltage is maintained at its predetermined voltage level during the shutdown operation until the regulated output voltage has dropped below the low reference voltage, thereby facilitating controlled and reliable shutdown of the voltage regulator when the enable signal is intentionally de-asserted, and preventing undesirable bandgap shutdown due to a short transient event.

BRIEF DESCRIPTION OF THE DRAWINGS

These and other features, aspects and advantages of the present invention will become better understood with regard to the following description, appended claims, and accompanying drawings, where:

FIGS. 2(A), 2(B), 2(C), 2(D), 2(E), 2(F), 2(G), 2(H), 2(I), 2(J) and 2(K) are timing diagrams showing various signals generated during operation of the voltage regulator of FIG. 1.

DETAILED DESCRIPTION OF THE DRAWINGS

The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or transistor).

Figure 1:
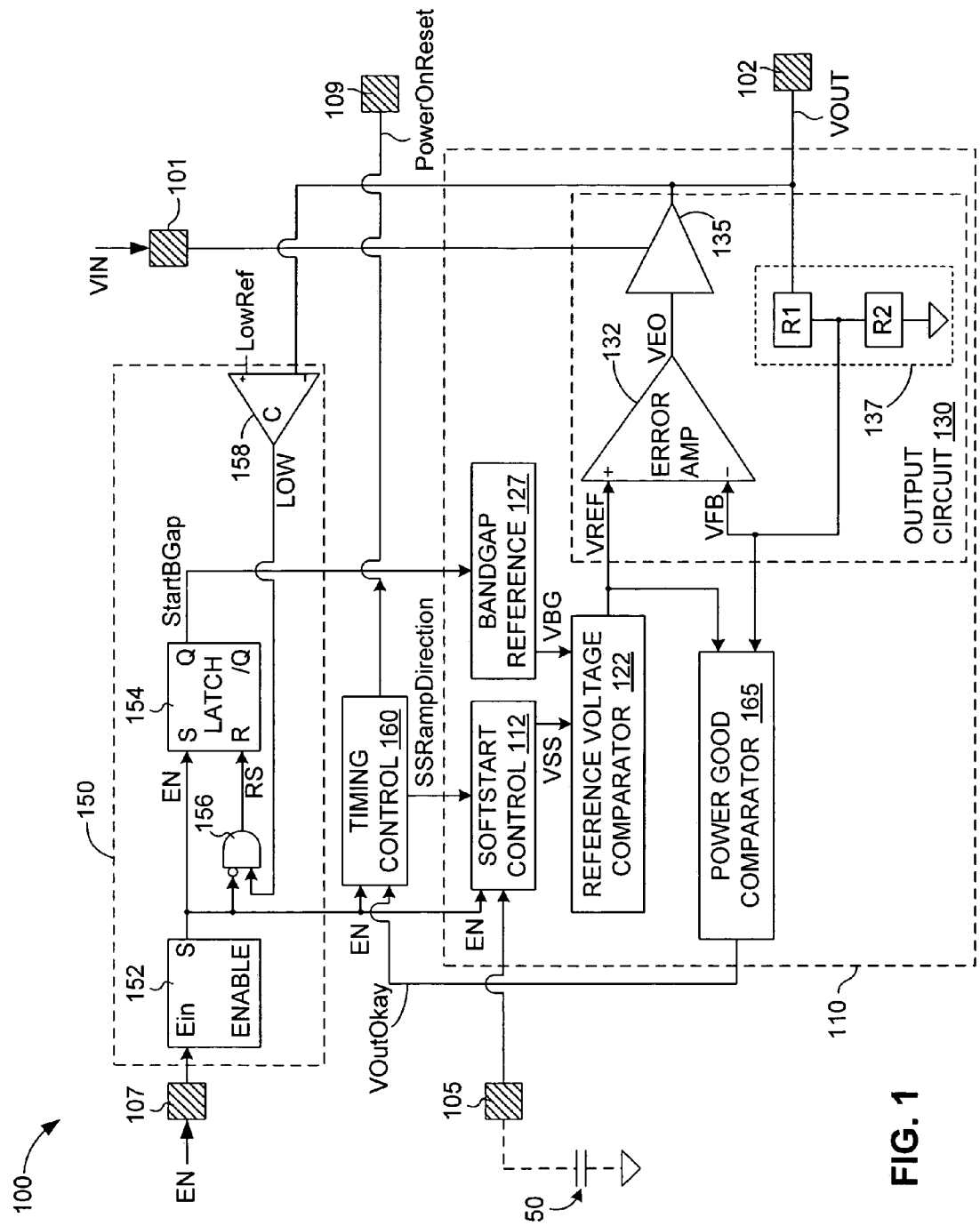
FIG. 1 is a block diagram showing a simplified voltage regulator according to an embodiment of the present invention.

FIG. 1 shows a voltage regulator 100 according to a simplified embodiment of the present invention. In one embodiment voltage regulator 100 is a discrete device (i.e., fabricated and packaged separately from other components of a complex electronic system circuit to which voltage regulator 100 is connected). As such, voltage regulator 100 includes several external pins for facilitating the transmission of power and control signals to and from the host complex electronic system circuit. These external pins include an input pin 101 for receiving an unregulated system voltage VIN, an output pin 102 for facilitating the transmission of a regulated output signal VOUT to an external circuit (not shown), a soft-start pin 105, an enable pin 107 for receiving an externally generated enable control signal EN, and a Power-On-Reset (POR) pin 109 for providing a PowerOnReset control signal for use by an external circuit driven by voltage regulator 100. Other external pins of voltage regulator 100 are omitted from the following discussion for brevity. In an alternative embodiment, voltage regulator 100 may be part of a larger integrated circuit, in which case output pin 102 and POR pin 109 are implemented by an interconnect (metal) line that may not be accessed externally.

As indicated in FIG. 1, voltage regulator 100 generally includes a main circuit 110, a bandgap control circuit 150, and a timing control circuit 160.

Referring to the lower portion of FIG. 1, main circuit 110 includes a soft-start/soft-stop control circuit 112 (herein referred to as "soft-start circuit 112" for brevity), a bandgap reference generator 127, a reference voltage comparator 122, an output circuit 130, and a power good comparator 165.

Soft-start control circuit 112 is connected to soft-start pin 105, and generates a ramped voltage VSS on a first input terminal of reference voltage comparator 122 by generating a current on a user-supplied external capacitor 50 that is connected to soft-start pin 105. The rate of rise/fall of ramped voltage VSS is determined by the capacitance of external capacitor 50 and the current supplied by soft-start control circuit 112.

Bandgap reference generator 127 generates a predetermined bandgap voltage VBG according to known techniques in response to a StartBGap control signal received from bandcap control circuit 150, which is generated in the manner described below.

Reference voltage comparator 122 is a unity gain amplifier (sometimes referred to as a "MIN AMP" circuit) that compares ramped voltage VSS and bandgap voltage VBG, and provides the smaller of these voltages as reference signal VREF. For example, when the ramped voltage VSS is less than bandgap voltage VBG, then reference signal VREF is equal to ramped voltage VSS. Conversely, when ramped voltage VSS is greater than bandgap voltage VBG, reference signal VREF is equal to bandgap voltage VBG. The function of comparator 122 is to cause output circuit 130 to generate an output voltage that is controlled by ramped voltage VSS whenever ramped voltage VSS is less than bandgap voltage VBG. At startup, ramped voltage VSS is initially zero volts (or very low), causing reference signal VREF to also be very low. As external capacitor 50 charges, ramped voltage VSS gradually increases, thereby causing a corresponding rise in reference signal VREF, which in turn causes output circuit 130 to generate output voltage VOUT in a manner that gradually increases toward its predetermined voltage level. Reference signal VREF will continue to rise until ramped voltage VSS reaches the voltage level of bandgap voltage VBG, at which point reference signal VREF will stabilize at the voltage level of bandgap voltage VBG, thereby causing output circuit 130 to stabilize output voltage VOUT at its predetermined voltage level. At shutdown (i.e., when enable control signal EN is de-asserted), the current at soft-start pin 105 is reversed through soft-start control circuit 112 to effectively discharge external capacitor 50 in a ramped fashion, thereby facilitating a softstop function using the same circuitry as that used to perform the soft-start operation.

Output circuit 130 includes an error amplifier (ERROR AMP) 132, an output driver circuit 135, and a feedback voltage divider 137. Error amplifier 132 has a first input terminal that receives reference signal VREF and a second input terminal that receives a feedback signal VFB from feedback voltage divider 137. Output driver circuit 135 generates a desired regulated output voltage VOUT in response to an output signal generated by error amplifier 135. The regulated output voltage VOUT is transmitted to output pin 102, which is also connected to feedback divider 137. Feedback voltage divider 137 includes a first resistor R1 and a second resistor R2 connected in series between output pin 102 and ground, and feedback signal VFB is generated at a node located between resistors R1 and R2.

Timing control circuit 160 coordinates various functions performed by voltage regulator 100 in response to enable control signal EN. These functions include generating a SSRampDirection control signal that is used to control the operation of soft-start control circuit 112, and generating a PowerOnReset control signal on POR pin 109. Specifically, timing control circuit 160 asserts the SSRampDirection control signal following assertion of the enable control signal EN, thereby causing soft-start control circuit 112 to begin charging external capacitor 50. Conversely, timing control circuit 160 de-asserts the SSRampDirection control signal at a predetermined point following de-assertion of the enable control signal EN, thereby causing soft-start control circuit 112 to begin discharging external capacitor 50 after a known delay. Timing control circuit 160 generates the PowerOnReset control signal on external POR pin 109 when both an output voltage monitor signalVOutOkay, which is generated by power good comparator 165, and the enable control signal EN are asserted. Power good comparator 165 compares reference voltage VREF generated by reference voltage comparator 122 with feedback voltage VFB from voltage divider 137, and generates output voltage monitor signal VOutokay when regulated output voltage VOUT is in regulation (e.g., within 10% of its predetermined target voltage level). During operation, timing control circuit 160 de-asserts the PowerOnReset control signal whenever power good comparator 165 de-asserts the VOutokay control signal, or when the external enable signal EN is de-asserted. Other functions performed by timing control circuit 160 are known to those skilled in the art, and are omitted from the following discussion for brevity.

Referring to the upper portion of FIG. 1, bandgap control circuit 150 includes an input buffer 152, a latch 154, a logic gate 156, and a detector 158. Input buffer 152 buffers the enable control signal EN according to known techniques. Latch 154 includes a set terminal S that is connected to an output terminal of buffer 152 to receive enable control signal EN, and a reset terminal R connected to an output terminal of logic gate 156. Latch 154 generates bandgap control signal StartBGap at its output terminal Q when the enable control signal EN is asserted, and maintains bandgap control signal StartBGap in an asserted state until logic gate 156 generates a rising edge reset signal RS on reset terminal R. Detector 158 compares the regulated output voltage VOUT with a predetermined low reference voltage LowRef, and asserts a low output voltage detection signal LOW when regulated output voltage VOUT falls below low reference voltage LowRef. Logic gate 156 is in one embodiment a two-input AND gate having one inverted input terminal. The inverted (first) input terminal of logic gate 156 is coupled to receive the enable control signal EN, and a second input terminal of logic gate 156 is coupled to the output terminal of detector 158. Logic gate 156 is thus configured to generate a high output signal only when the enable control signal EN is de-asserted (low) and detector 158 asserts the output voltage detection signal LOW. When these conditions are met and logic gate 156 generates a rising edge signal, latch 156 is reset to de-assert bandgap control signal StartBGap.

Operation of voltage regulator 100 will now be described with reference to FIGS. 2(A) to 2(K).

Figure 2H:
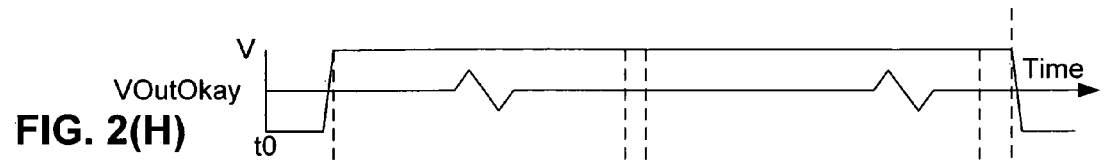

At system startup (time to), enable control signal EN is asserted (FIG. 2(A)) and transmitted to timing control circuit 160, the set terminal of latch 154, and to the inverted input terminal of logic gate 156. The rising edge of enable control signal EN causes latch 154 to assert bandgap control signal StartBGap (FIG. 2(D)), and causes timing control circuit 160 to assert the SSRampDirection control signal (FIG. 2(B)). Note that reset signal RS from logic gate 156 remains low at startup (FIG. 2(K)). The asserted SSRampDirection control signal causes soft-start control circuit 112 to generate ramp signal VSS such that ramp signal VSS gradually rises to a predetermined maximum value at time t1 (FIG. 2(C)). Reference signal VREF rises in response to ramp signal VSS (FIG. 2(F)), which in turn causes output circuit 130 to ramp up output voltage VOUT (FIG. 2(G)). When output voltage VOUT reaches a predetermined level, power on comparator 165 asserts output voltage monitor signal VOutokay (FIG. 2(H)). With both enable control signal EN and output voltage monitor signal now asserted, timing control circuit 160 asserts the PowerOnReset signal (FIG. 2(I)). During subsequent "normal" operation, regulated output voltage VOUT is maintained at the predetermined target voltage level by bandgap voltage VBG.

Figure 2I:
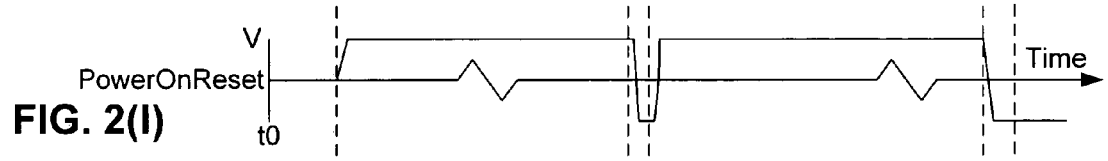
Figure 2J:
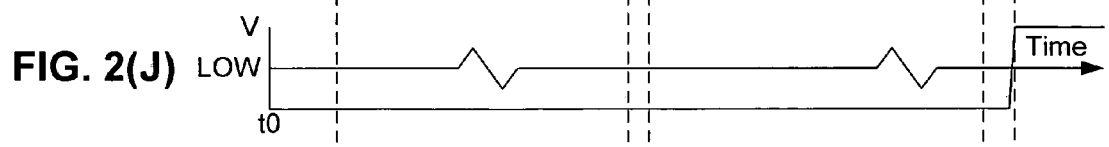
Figure 2K:
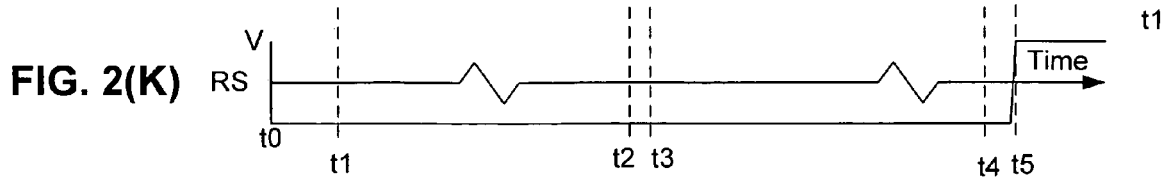

In accordance with an aspect of the invention, voltage regulator 100 prevents undesirable bandgap shutdowns that can occur in the event of a short transient event during normal operation using conventional techniques. As indicated in FIG. 2(A) at time t2, a short transient event is depicted by a brief drop in enable control signal EN (i.e., a falling edge at time t2 followed by a restoring rising edge at time t3). In accordance with the present invention, this brief enable control signal de-assertion causes timing control circuit 160 to briefly de-assert the SSRampDirection control signal (FIG. 2(B)), which in turn causes soft-start circuit 112 to briefly initiate soft-stop operation (i.e., as indicated in FIG. 2(C), ramp voltage VSS begins to gradually decrease at time t2). In addition, the de-asserted enable control signal EN causes timing control circuit 160 to briefly de-assert the PowerOnReset signal (as indicated in FIG. 2(I)). The decreasing ramp voltage VSS pulls down reference signal VREF (FIG. 2(F)), which in turn causes output voltage VOUT to decrease slightly (FIG. 2(G)). However, due to the short duration of the transient event, the rising edge of enable control signal EN at time t3 (FIG. 2(A)) restores the SSRampDirection control signal (FIG. 2(B)), which in turn causes soft-start circuit 112 to re-assert a soft-start operation (i.e., as indicated in FIG. 2(C), ramp voltage VSS returns to its maximum level). Because output voltage VOUT did not fall below low reference voltage LowRef during the transient event, the low voltage detector signal LOW generated by detector 158 remains low (FIG. 2(J)), which in turn prevents logic gate 156 from resetting latch 154 (note that the re-asserted enable control signal EN also prevents logic gate 156 from resetting latch 154). Accordingly, voltage regulator 100 exhibits robustness due to its ability to avoid unintended system wide shutdown or failure caused by the short transient event. In a similar manner, if regulated output voltage VOUT briefly drops below low reference voltage LOW, the high enable control signal EN prevents reset of latch 154, thus maintaining bandgap voltage VBG at its steady state and allowing regulated output voltage VOUT to recover to its predetermined target voltage level. Note that the brief drop in regulated output voltage VOUT would be detected by power good comparator 165, which would briefly de-assert output voltage monitor signal VOutokay, which in turn would cause timing control circuit to de-assert the PowerOnReset signal until regulated output voltage VOUT is restored.

When the system is subsequently shutdown (time t4), enable control signal EN is de-asserted and remains so for a longer period than during the short transient event (FIG. 2(A)). The de-asserted enable control signal causes timing control circuit 160 to de-assert the PowerOnReset signal (FIG. 2(I)), and to de-assert the SSRampDirection control signal (FIG. 2(B)), which in turn causes soft-start circuit 112 to initiate the soft-stop operation (i.e., as indicated in FIG. 2(C), ramp voltage VSS begins to ramp down). As ramp voltage VSS ramps down, so too does reference signal VREF (FIG. 2(F)), which in turn causes output voltage VOUT to ramp down (FIG. 2(G)). When output voltage VOUT drops below low reference voltage LowRef (i.e., at time t5; see FIG. 2(G)), detector 158 asserts low output voltage detection signal LOW (FIG. 2(J)). At this point, with enable control signal EN at a low voltage level (FIG. 2(A)) and detection signal LOW at a high voltage level, logic gate 156 asserts reset signal RS (FIG. 2(K)), which causes latch 154 to de-assert bandgap control signal StartBGap (FIG. 2(D)), which in turn causes bandgap reference generator 127 to de-assert bandgap voltage VBG (FIG. 2(E)). Thus, bandgap control circuit 150 facilitates a controlled and reliable shutdown of voltage regulator 100 such that bandgap voltage VBG is de-asserted after output voltage VOUT is ramped down. In addition, because the PowerOnReset signal is de-asserted well before regulated output voltage VOUT drops out of regulation, a microprocessor or other complex logic system receiving regulated output voltage VOUT is provided a known time to 'tidy up' memory or other registers for a well controlled shutdown.

Although the present invention has been described with respect to certain specific embodiments, it will be clear to those skilled in the art that the inventive features of the present invention are applicable to other embodiments as well, all of which are intended to fall within the scope of the present invention. For example, in accordance with an alternative embodiment, a shutdown delay period may be implemented by timing control circuit 160 that extends the voltage regulator 'ON' time (i.e., the amount of time output voltage VOUT remains asserted) after de-assertion of enable control signal to allow graceful system shutdown.

The invention claimed is:

1. A voltage regulator for generating a regulated output voltage in response to an externally supplied enable control signal, the voltage regulator comprising:
   a bandgap reference generator for generating a bandgap voltage having a predetermined voltage level;
   a soft-start control circuit for generating a ramped voltage that gradually increases during a startup period and gradually decreases during a shutdown period, the startup period occurring after the enable control signal is asserted, and the shutdown period occurring after the enable control signal is de-asserted;
   a reference voltage comparator having a first input terminal connected to the soft-start control circuit and a second input terminal connected to the bandgap reference generator, wherein the reference voltage comparator includes including means for generating a reference signal that is equal to the ramped voltage while the ramped voltage is lower than the predetermined voltage level of the bandgap signal, and is equal to the bandgap signal when the predetermined voltage level is lower than the ramped voltage;
   an output circuit for generating the regulated output voltage in response to the reference signal; and
   a bandgap control circuit for controlling the bandgap reference generator to maintain the bandgap voltage at the predetermined voltage level during the shutdown period until the regulated output voltage decreases below a predetermined low reference voltage.

2. The voltage regulator according to claim 1, wherein the bandgap control circuit comprises means for controlling the bandgap reference generator to generate the bandgap voltage immediately after the enable control signal is asserted.

3. The voltage regulator according to claim 2, wherein said means for controlling the bandgap reference generator comprises a latch having a set terminal coupled to receive the enable control signal.

4. The voltage regulator according to claim 3, wherein the bandgap control circuit further comprises:
   a low output voltage detector for generating a low output voltage detection signal when the regulated output voltage falls below a low reference voltage; and
   a logic gate for generating a reset signal when the enable control signal is de-asserted and the low output voltage detection signal is asserted.

5. The voltage regulator according to claim 4, wherein the logic gate comprises a logic AND gate.

6. The voltage regulator according to claim 1, further comprising a timing control circuit for controlling the soft-start control circuit to gradually increase the ramped voltage during the startup period, and to gradually decrease the ramped voltage during the shutdown period.

7. The voltage regulator according to claim 6, wherein the timing control circuit further comprises means for asserting a power on reset control signal only when the externally supplied enable control signal is asserted and the regulated output voltage is within a predetermined percentage of a predetermined target voltage level.

8. The voltage regulator according to claim 7, further comprising means for comparing a portion of the regulated output voltage with the reference signal, for transmitting an output voltage monitor signal to the timing control circuit when the regulated output voltage is within the predetermined percentage of the predetermined target voltage level.

9. The voltage regulator according to claim 1, wherein the output circuit comprises:
   a voltage divider for generating a feedback voltage that is equal to the regulated output voltage multiplied by a predetermined divider ratio;
   an error amplifier having a first input terminal connected to the reference voltage comparator and a second input terminal connected to receive the feedback signal; and
   an output driver circuit for generating generates the regulated output voltage in response to an output signal generated by the error amplifier.

10. A voltage regulator for generating a regulated output voltage in response to an externally supplied enable control signal, the voltage regulator comprising:
    means for generating a bandgap voltage having a predetermined voltage level;
    means for generating a ramped voltage that gradually increases during a startup period and gradually decreases during a shutdown period, the startup period occurring after the enable control signal is asserted, and the shutdown period occurring after the enable control signal is de-asserted;
    means for generating a reference signal that is equal to the ramped voltage while the ramped voltage is lower than the predetermined voltage level of the bandgap signal, and is equal to the bandgap signal when the predetermined voltage level is lower than the ramped voltage;
    means for generating the regulated output voltage in response to the reference signal; and
    means for controlling the bandgap reference generator to maintain the bandgap voltage at the predetermined voltage level during the shutdown period until the regulated output voltage decreases below a predetermined low reference voltage.

11. A method for controlling a voltage regulator to generate a regulated output voltage in response to an externally supplied enable control signal, the method comprising:
    generating a bandgap voltage having a predetermined voltage level;
    generating a ramped voltage that gradually increases during a startup period and gradually decreases during a shutdown period, the startup period occurring after the enable control signal is asserted, and the shutdown period occurring after the enable control signal is de-asserted;
    generating a reference signal that is equal to the ramped voltage while the ramped voltage is lower than the predetermined voltage level of the bandgap signal, and is equal to the bandgap signal when the predetermined voltage level is lower than the ramped voltage;
    generating the regulated output voltage in response to the reference signal; and
    controlling the bandgap reference generator to maintain the bandgap voltage at the predetermined voltage level during the shutdown period until the regulated output voltage decreases below a predetermined low reference voltage.

* * * * *

UNITED STATES PATENT AND TRADEMARK OFFICE
CERTIFICATE OF CORRECTION

PATENT NO. : 7,157,892 B1 Page 1 of 1
APPLICATION NO. : 11/288882
DATED : January 2, 2007
INVENTOR(S) : David Wayne Ritter It is certified that error appears in the above-identified patent and that said Letters Patent is hereby corrected as shown below:

Column 8, line 51, delete "including".

Column 9, line 40, delete "generates".

Signed and Sealed this

Fifteenth Day of May, 2007

JON W. DUDAS
*Director of the United States Patent and Trademark Office*